US009006928B2

United States Patent
Yoshikuni et al.

(10) Patent No.: US 9,006,928 B2
(45) Date of Patent: Apr. 14, 2015

(54) CURRENT AND VOLTAGE DETECTION CIRCUIT, AND CURRENT CONTROL CIRCUIT

(75) Inventors: Masato Yoshikuni, Tama (JP); Tomomitsu Ohara, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 807 days.

(21) Appl. No.: 13/248,248

(22) Filed: Sep. 29, 2011

(65) Prior Publication Data
US 2012/0080952 A1 Apr. 5, 2012

(30) Foreign Application Priority Data
Sep. 30, 2010 (JP) .................................. 2010-220508

(51) Int. Cl.
| | | |
|---|---|---|
| H02J 7/34 | (2006.01) | |
| H02J 1/10 | (2006.01) | |
| G05F 3/16 | (2006.01) | |
| G05F 3/06 | (2006.01) | |
| H02J 7/35 | (2006.01) | |

(52) U.S. Cl.
CPC .... *H02J 1/10* (2013.01); *H02J 7/35* (2013.01)

(58) Field of Classification Search
None
See application file for complete search history.

(56) References Cited

U.S. PATENT DOCUMENTS

2009/0302805 A1* 12/2009 Motoichi et al. .............. 320/164

FOREIGN PATENT DOCUMENTS

| JP | 2009-294981 A | 12/2009 |
|---|---|---|
| JP | 2010-104117 A | 5/2010 |

* cited by examiner

*Primary Examiner* — Jared Fureman
*Assistant Examiner* — Aqeel Bukhari
(74) *Attorney, Agent, or Firm* — Holtz, Holtz, Goodman & Chick PC

(57) ABSTRACT

Disclosed is a current and voltage detection circuit comprising: a voltage input terminal to which a direct current voltage is applied; a voltage comparison circuit that determines which of the applied voltage and a predetermined voltage is larger; a switching element connected in series to a current-voltage conversion unit, between a positive electrode terminal of the power supply and a reference potential point of the circuit; and a control circuit that generates a control signal of the switching element in response to output of the voltage comparison circuit, wherein the circuit turns ON the switching element and determines the voltage, by the voltage comparison circuit, when a voltage supply capability or current supply capability is low; and turns OFF the switching element by the control signal and determines the voltage, when the voltage comparison circuit determines that the voltage is higher than the predetermined voltage.

6 Claims, 8 Drawing Sheets

POWER SUPPLY VOLTAGE CAPABILITY [V]

POWER SUPPLY CURRENT CAPABILITY [A]

CMP1 DETECTION VOLTAGE [V]

SW1 OPERATION [ON / OFF]

CMP1 OUTPUT Vo

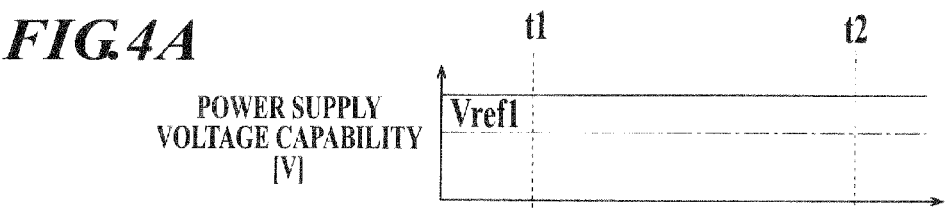
FIG.4A POWER SUPPLY VOLTAGE CAPABILITY [V]
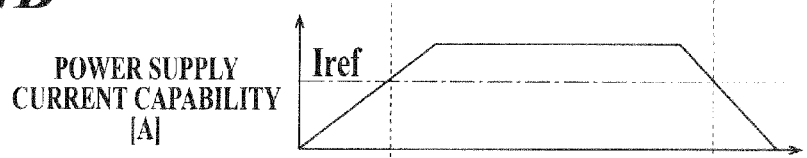
FIG.4B POWER SUPPLY CURRENT CAPABILITY [A]
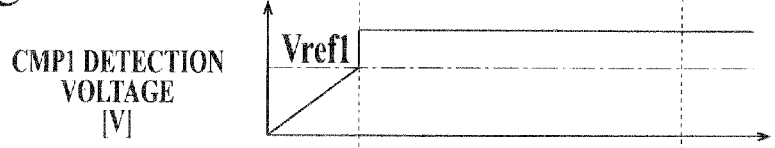
FIG.4C CMP1 DETECTION VOLTAGE [V]
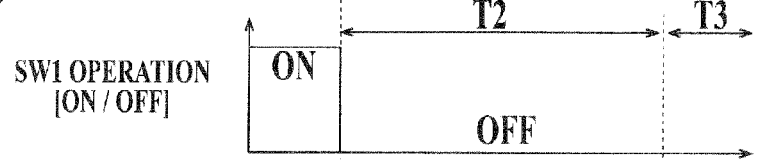
FIG.4D SW1 OPERATION [ON / OFF]
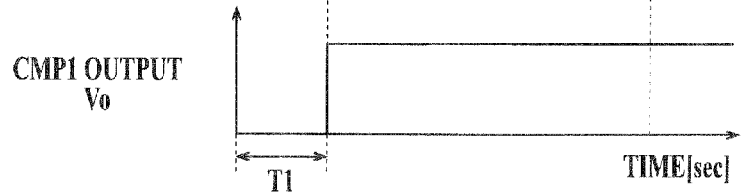
FIG.4E CMP1 OUTPUT Vo

CURRENT AND VOLTAGE DETECTION CIRCUIT, AND CURRENT CONTROL CIRCUIT

BACKGROUND OF THE INVENTION

1. Field of the Invention

The present invention relates to a current and voltage detection circuit that detects a current and a voltage, which are supplied from a power supply, and to a current control circuit that performs current control corresponding to the current and the voltage, which are detected by the current and voltage detection circuit. For example, the present invention relates to a technology effective for use in a charge control device that charges a secondary battery.

2. Background Art

For a charge device of a secondary battery, there is used a charge control circuit that controls a charge current by a current-controlling transistor composed of a MOSFET (an insulating gate-type field effect transistor: hereinafter, referred to as a MOS transistor) provided between an input terminal, to which a direct-current voltage from a primary power supply such as an AC adapter is inputted, and an output terminal, to which a secondary battery is connected. Heretofore, in the charge control circuit, a current that flows through the current-controlling transistor at the time of charge has been detected, whereby control has been performed so that the charge current can be constant (refer to Japanese Patent Laid-Open Publication No. 2009-294981).

Meanwhile, as an electronic instrument equipped with a solar cell has been being widespread, there have been proposed a variety of inventions regarding a power supply device that uses a solar cell as a power supply and regarding a charge control circuit that charges a secondary battery by using a solar cell as a primary power supply (refer to Japanese Patent Laid-Open Publication No. 2010-104117).

In the solar cell, an output current and output voltage thereof are changed relatively largely in response to an amount of solar radiation and to a load. Accordingly, in the power supply device that uses the solar cell as the power supply and in the charge control device that charges the secondary battery by using the solar cell as the primary power supply, it is necessary to detect the current and the voltage. In the conventional detection of the current and the voltage, it has been general to separately provide: as shown in FIG. 8A, a voltage detection circuit including a comparator CMP1 that compares an input voltage Vs and a reference voltage Vref1 with each other; and as shown in FIG. 8B, a current detection circuit including a sensing resistor Rs, which converts an input current Is into a voltage, and a comparator CMP2 that detects a voltage drop of the resistor concerned. However, such a detection method has a problem that, since two comparators are used, a circuit scale is increased, and an increase of a chip size is brought about in the case of composing the control circuit as an IC.

SUMMARY OF THE INVENTION

This invention has been made paying attention to the problem as described above. It is an object of this invention to provide a current and voltage detection circuit, which is capable of detecting the current and the voltage by one comparator, in the power supply device and the charge control device, which use the power supply such as the solar cell in which the output current and the output voltage are changed relatively largely.

According to an aspect of the present invention, there is provided a current and voltage detection circuit comprising:
a voltage input terminal to which a direct current voltage from a power supply is applied;
a voltage comparison circuit that determines which of the voltage applied to the voltage input terminal and a predetermined voltage is larger;
a switching element connected in series to a current-voltage conversion unit, between a positive electrode terminal of the power supply and a reference potential point of the circuit; and
a control circuit that generates a control signal of the switching element in response to an output of the voltage comparison circuit,
wherein the current and voltage detection circuit is configured to turn the switching element to an ON-state and determine the voltage being applied to the voltage input terminal, by the voltage comparison circuit, when either of a voltage supply capability and current supply capability of the power supply is low; and to turn the switching element to an OFF-state by the control signal outputted from the control circuit and determine the voltage being applied to the voltage input terminal, by the voltage comparison circuit, when the voltage comparison circuit determines that the voltage applied to the voltage input terminal is higher than the predetermined voltage.

According to another aspect of the present invention, there is provided a current control circuit comprising:
the current and voltage detection circuit;
a current-controlling transistor that is connected between the voltage input terminal and an output terminal and controls a current flown from the voltage input terminal to the output terminal;
a current-detecting transistor that is connected in parallel to the current-controlling transistor, has a size smaller than a size of the current-controlling transistor, and has a control terminal applied with the same control voltage as a voltage for the current-controlling transistor; and
a control voltage generation circuit that generates a control voltage for the current-controlling transistor in response to a voltage converted by either of the current-detecting transistor and a second current-voltage conversion unit connected in series to the current-controlling transistor.

BRIEF DESCRIPTION OF THE DRAWINGS

The above and other objects, advantages and features of the present invention will become more fully understood from the detailed description given hereinbelow and the appended drawings and tables which are given byway of illustration only, and thus are not intended as a definition of the limits of the present invention, and wherein:

FIGS. 4A to 4E are timing charts showing operations of the current and voltage detection circuit of the embodiment in a state where the solar cell operates in a characteristic range where the voltage supply capability is substantially constant and the current supply capability is changed;

PREFERRED EMBODIMENTS OF THE INVENTION

A description is made below of preferred embodiments of the present invention based on the drawings.

Figure 1:
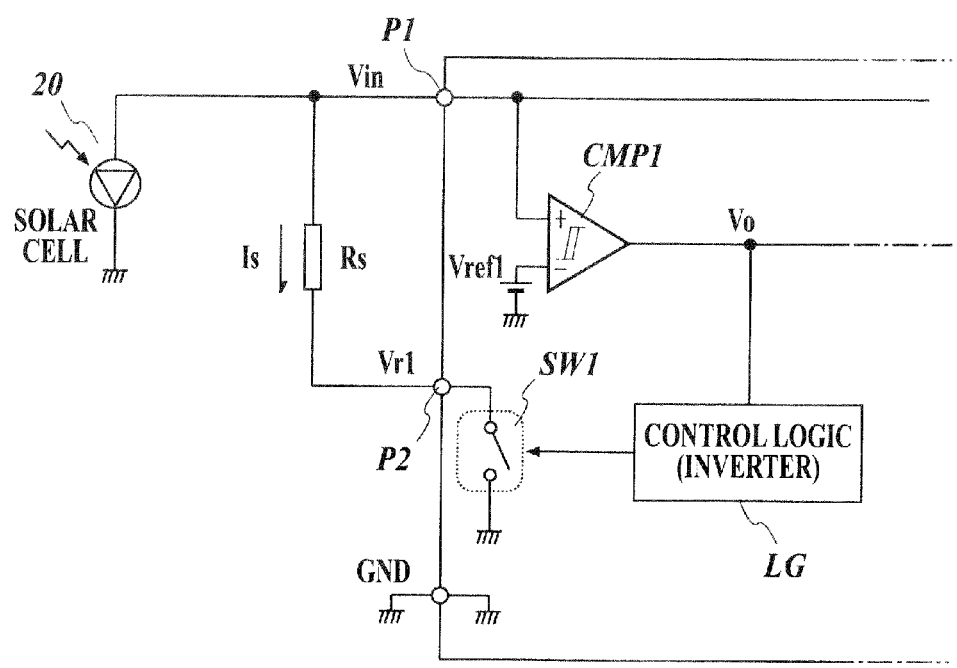
FIG. 1 is a circuit configuration diagram showing an embodiment of a current and voltage detection circuit according to the present invention.

FIG. 1 shows an embodiment of a current and voltage detection circuit according to the present invention.

As shown in FIG. 1, the current and voltage detection circuit of this embodiment includes: a voltage input terminal P1 applied with a direct current voltage Vin from a primary power supply 20, for example, such as a solar cell in which an output voltage and an output current are changed relatively largely; a comparator CMP1 as a voltage comparison circuit using a differential amplifier in which a non-inverting input terminal is connected to the voltage input terminal P1 concerned; a current input terminal P2 for drawing the current from the primary power supply 20; a switching element SW1 connected between the current input terminal P2 concerned and a ground point as a reference potential point of the circuit; and a control logic circuit LG that generates a control signal for switching on and off the switching element SW1 in response to an output of the above-described comparator CMP1. The comparator CMP1, the switching element SW1 and the control logic circuit LG can be composed as a semiconductor integrated circuit on one semiconductor chip. For the comparator CMP1, one having hysteresis characteristics is used.

The current and voltage detection circuit of this embodiment includes: a current detection mode, in which a current-detecting sensing resistor Rs is connected between a positive electrode terminal of the primary power supply 20 and the above-described current input terminal P2, the switching element SW1 is switched ON to thereby flow a current Is from the primary power supply 20 to the sensing resistor Rs and to then convert the current Is into a voltage, and the voltage concerned and a predetermined reference voltage Vref1 are compared with each other by the comparator CMP1 to thereby detect a difference therebetween; and a voltage detection mode, in which the switching element SW1 is switched off, and the input voltage Vin from the primary power supply 20 and the reference voltage Vref1 are compared with each other by the comparator CMP1 to thereby detect a difference therebetween. The current and voltage detection circuit is composed so as to be capable of using one comparator for both of the current detection and the voltage detection by performing the current detection and the voltage detection in a time division manner.

Next, by using FIG. 2A to FIG. 4E, a description is made of specific current and voltage detection operations by the current and voltage detection circuit of FIG. 1. Note that, in the case of assuming the simplest control, the control logic circuit LG can be composed of one inverter that inverts the output of the comparator CMP1, and accordingly, the control logic circuit LG is regarded as an inverter in the following description that is based on FIG. 1. Moreover, the detection operations to be described below are those in the case where the primary power supply 20 is a solar cell. Voltage-current characteristics of the solar cell are illustrated in a graph shown in FIG. 2A. The graph is broadly divided into: a characteristic range A where the voltage is substantially constant and the current is changed largely; and a characteristic range B where the current is substantially constant and the voltage is changed largely. Such operation ranges change in response to an incident state of sunlight onto the solar cell and to a load to the solar cell.

First, by using FIGS. 3A to 3E, a description is made of operations in the case where the current and voltage detection circuit is activated in a state of operating in the characteristic range B where a current supply capability (power supply current capability) of the solar cell 20 is substantially constant and a voltage supply capability (power supply voltage capability) thereof is changed. Here, such a term "activation" includes the case where the solar cell is electrically connected to the voltage input terminal P1 in a state where a power supply voltage is supplied thereto as well as the case where a power supply voltage for the circuit (IC) is turned on.

The circuit is composed so that the output Vo of the comparator CMP1 can be at a low level immediately after the activation. Then, an output of the control logic circuit LG (inverter) turns to a high level, and the switching element SW1 is turned to an ON-state (period T1). Therefore, the current outputted from the solar cell flows to the sensing resistor Rs, the voltage drops by internal resistance of the solar cell, a relatively low voltage is applied to the voltage input terminal P1, and the comparator CMP1 compares the voltage concerned and the reference voltage Vref1 with each other. Therefore, the output Vo of the comparator CMP1 is at the low level at the beginning (period T1).

Figure 3A:
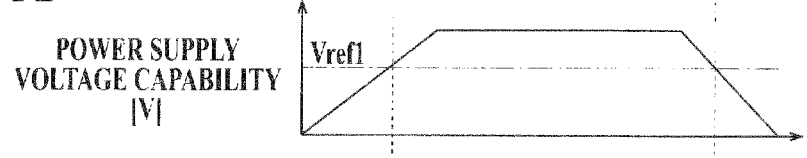
FIGS. 3A to 3E are timing charts showing operations of the current and voltage detection circuit of the embodiment in a state where the solar cell operates in a characteristic range where a current supply capability is substantially constant and a voltage supply capability is changed.
Figure 3B:
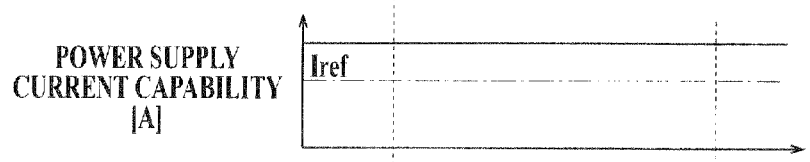
Figure 3C:
Figure 3D:
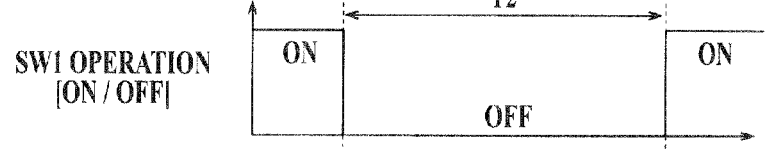
Figure 3E:
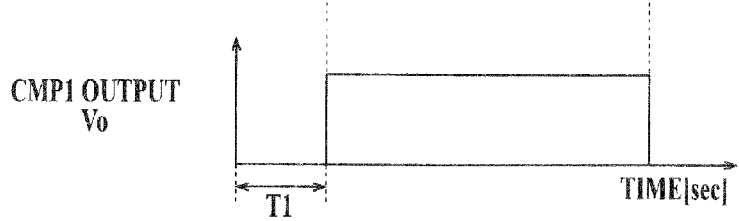

Thereafter, as the voltage supply capability of the solar cell is being increased as shown in FIG. 3A, a detection voltage (input voltage) of the comparator CMP1 gradually rises as shown in FIG. 3C. Then, at the point of time when the detection voltage exceeds the reference voltage Vref1, the output Vo of the comparator CMP1 is changed to the high level as shown in FIG. 3E, the output of the control logic circuit LG (inverter) turns to the low level, and the switching element SW1 is turned from the ON-state to an OFF-state (timing t1).

Then, the current that flows to the sensing resistor Rs is shut off, and the mode is changed from the current detection mode to the voltage detection mode. Therefore, the output voltage of the solar cell 20 is applied to the voltage input terminal P1, and while the voltage is being higher than the reference voltage Vref1, the output Vo of the compactor CMP1 is maintained at the high level, the output of the control logic circuit LG (inverter) is maintained at the low level, and the switching element SW1 is left OFF (period T2). Thereafter, when the voltage supply capability of the solar cell is reduced, and the detection voltage becomes lower than the reference voltage Vref1, the output Vo of the comparator CMP1 is changed to the low level, the switching element SW1 is turned from the OFF-state to the ON-state, and the mode is changed from the voltage detection mode to the current detection mode (timing t2).

Next, by using FIGS. 4A to 4E, a description is made of operations in the case where the current and voltage detection circuit is activated in a state of operating in the characteristic range A where the voltage supply capability of the solar cell is constant and the current supply capability thereof is changed.

Immediately after the activation, the output of the comparator CMP1 is at the low level. Accordingly, the output of the control logic circuit LG (inverter) turns to the high level, and the switching element SW1 is turned to the ON-state (period T1). Therefore, the current outputted from the solar cell 20 is flown to the sensing resistor Rs and the switching element SW1, the voltage converted by the sensing resistor Rs is applied to the voltage input terminal P1, and the comparator CMP1 compares the voltage concerned and the reference voltage Vref1 with each other. As a result, as the current supply capability of the solar cell is being increased as shown in FIG. 4B, the detection voltage (input voltage) of the comparator CMP1 gradually rises as shown in FIG. 4C.

Then, at the point of time when the detection voltage exceeds the reference voltage Vref1, the output Vo of the comparator CMP1 is changed to the high level as shown in FIG. 4E, the output of the control logic circuit LG (inverter) turns to the low level, and the switching element SW1 is turned from the ON-state to the OFF-state (timing t1). Then, the current that flows to the sensing resistor Rs is shut off, and the output voltage of the solar cell 20 is applied to the voltage input terminal P1. Therefore, the output of the comparator CMP1 is maintained at the high level, and the output of the control logic circuit LG (inverter) is maintained at the low level, and the switching element SW1 is left OFF (period T2). Thereafter, even if the current supply capability is reduced as during a period T3, the output Vo of the comparator CMP1 is maintained at the high level, and the switching element SW1 is maintained in the OFF-state.

Figure 2A:
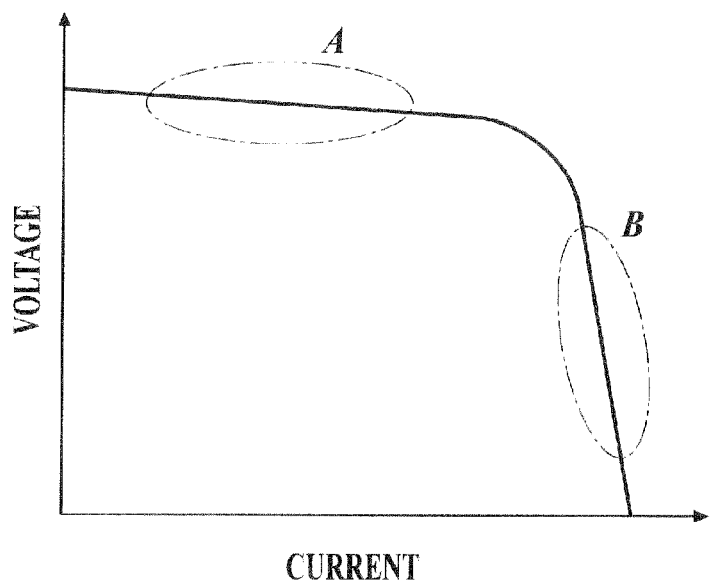
FIGS. 2A and 2B are graphs showing voltage-current characteristics and power-voltage characteristics of a solar cell as a primary power supply.
Figure 2B:
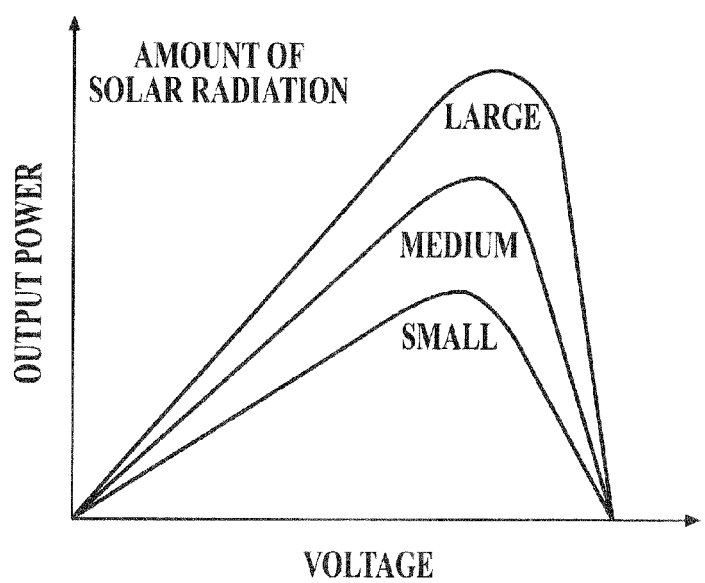

As shown in FIG. 2B, in the solar cell, the output power-voltage characteristics differ depending on an amount of solar radiation, and based only on the voltage or the current, it cannot be determined whether or not the solar cell is in a state capable of supplying effective power to the load. In this connection, as mentioned above, the current and voltage detection circuit of this embodiment first attempts to flow the current to the sensing resistor Rs, and in response to the state of the input terminal at that time, decides whether or not to shift to the voltage detection mode, and is thereby configured to determine whether or not the solar cell is in the state capable of supplying the effective power. The current and voltage detection circuit can detect the current and the voltage by one comparator. Moreover, after flowing the current to the sensing resistor Rs, making the determination, and shifting to the voltage detection mode, the current and voltage detection circuit shuts off the current flown to the sensing resistor Rs, and accordingly, also has an advantage in being capable of suppressing a current consumption.

Figure 5:
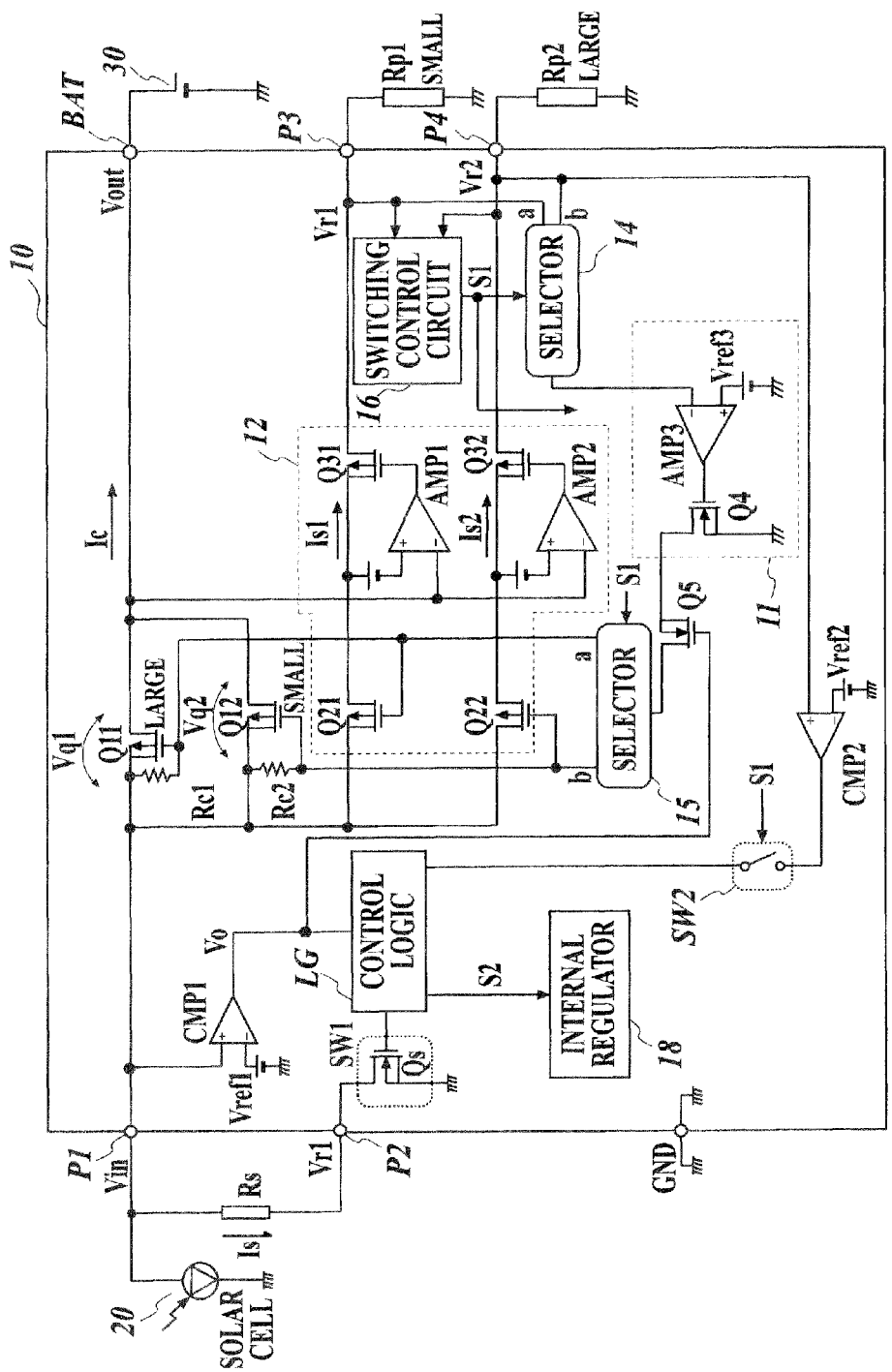
FIG. 5 is a circuit configuration diagram showing an embodiment of a charge-controlling IC, to which the current and voltage detection circuit of the present invention is applied, and an embodiment of a charge device using the charge-controlling IC.

FIG. 5 shows an embodiment of a charge-controlling IC for a secondary battery, to which the current and voltage detection circuit according to the present invention is applied, and a schematic configuration of a charge device using the charge-controlling IC.

As shown in FIG. 5, the charge device of this embodiment includes: the primary power supply 20, for example, such as the solar cell; and a charge-controlling IC 10 that charges a secondary battery 30 such as a lithium ion battery with the direct current voltage Vin inputted by the primary power supply 20.

The charge controlling IC 10 of this embodiment includes: the voltage input terminal P1 to which the direct current voltage from the primary power supply 20 is inputted; a battery terminal BAT as an output terminal to which the secondary battery 30 as a charge target is connected; a current-controlling MOS transistor Q11 composed of a P-channel MOSFET provided between the above-described voltage input terminal P1 and the above-described battery terminal BAT; a gate voltage control circuit (control voltage generation circuit) 11 that generates a gate control voltage for the current-controlling MOS transistor Q11; an output current detection circuit 12 that detects a current of the current-controlling MOS transistor Q11 by a current mirror mode; and an internal regulator 18 that generates a power supply voltage of an inside of the IC based on the direct current from the primary power supply 20 or the secondary battery.

Moreover, in this embodiment, a current-controlling MOS transistor Q12 smaller in size than the current-controlling MOS transistor Q11 is provided in parallel thereto. Then, the output current detection circuit 12 includes: a current-detecting MOS transistor Q21, which composes a current mirror circuit together with the current-controlling MOS transistor Q11, and a current-detecting MOS transistor Q22, which composes a current mirror circuit together with the current-controlling MOS transistor Q12; bias state-controlling MOS transistors Q31 and Q32, which are connected in series to the current-detecting MOS transistors Q21 and Q22, respectively; and error amplifiers AMP1 and AMP 2, which output powers corresponding to detection currents. Drain terminals of the bias state-controlling MOS transistors Q31 and Q32 are respectively connected to external terminals P3 and P4 to which current-detecting resistors Rp1 and Rp2 are connected on an outside of a chip. By the resistors Rp1 and Rp2, currents which flow through the transistors Q21 and Q22 are converted into voltages.

In the current-detecting MOS transistor Q21, a gate width thereof has a size of 1/N of that of the above-described current controlling MOS transistor Q11, a source terminal thereof is connected to the above-described voltage input terminal P1, and the same voltage as that for the current-controlling MOS transistor Q11 is applied to a control terminal (gate terminal) thereof, whereby a current with a size of 1/N of that of a drain current of the current-controlling MOS transistor Q11 is flown by the current-detecting MOS transistor Q21 concerned. Moreover, in the current-detecting MOS transistor Q22, a gate width thereof has a size of 1/N of that of the above-described current controlling MOS transistor Q12, a source terminal thereof is connected to the above-described voltage input terminal P1, and the same voltage as that for the current-controlling MOS transistor Q12 is applied to a control terminal (gate terminal) thereof, whereby a current with a size of 1/N of that of a drain current of the current-controlling MOS transistor Q12 is flown by the current-detecting MOS transistor Q22 concerned. The size ratio N can be set, for example, at a value approximately ranging from several hundred to several thousands, whereby the currents which flow through the current-detecting MOS transistors Q21 and Q22 can be made extremely small, and losses in the current-detecting resistors (Rp1, Rp2) can be reduced.

The error amplifier AMP1 receives a drain voltage of the current-controlling MOS transistor Q11 and a drain voltage of the current-detecting MOS transistor Q21, applies a voltage, which corresponds to a potential difference therebetween, to a gate terminal of the bias state-controlling MOS transistor Q31, and equalizes a bias state of the current-detecting MOS transistor Q21, that is, an inter-source/drain voltage thereof with an inter-source/drain voltage of the current-controlling MOS transistor Q11, thereby flows a current, which is more accurately proportional to the drain current of the current-controlling MOS transistor Q11, to the current-detecting MOS transistor Q21.

Moreover, the error amplifier AMP2 receives a drain voltage of the current-controlling MOS transistor Q12 and a drain voltage of the current-detecting MOS transistor Q22, applies a voltage, which corresponds to a potential difference therebetween, to a gate terminal of the bias state-controlling MOS transistor Q32, and equalizes a bias state of the current-detecting MOS transistor Q22, that is, an inter-source/drain voltage thereof with an inter-source/drain voltage of the current-controlling MOS transistor Q12, thereby flows a current, which is more accurately proportional to the drain current of the current-controlling MOS transistor Q12, to the current-detecting MOS transistor Q22.

As described above, there are provided: two current-controlling MOS transistors Q11 and Q12; and two current-detecting MOS transistors Q21 and Q22. This is because there are such problems as mentioned below in the case of using, as the primary power supply, the solar cell in which the voltage and the current are varied. That is to say, when the number of each of the current-controlling MOS transistors and the current-detecting MOS transistors is one, first, in the case where the amount of solar radiation is small and a charge current is extremely small, a voltage difference between the primary power supply 20 and the secondary battery 30, that is, a voltage difference Vq1 between the source and drain of the current-controlling transistor becomes extremely small, and it becomes impossible to accurately detect the charge current owing to an influence of an offset voltage of the differential amplifier AMP1. Second, when a controllable charge current range is widened, detection voltages at the current-voltage-converting resistors Rp at the time of a high charge current become too high, a detection voltage Vr1 is clamped to the input voltage Vin, and it becomes impossible to perform current control.

In the charge-controlling IC 10 of this embodiment, the sizes of the transistors Q11 and Q12 are set so that the size of the transistor Q11 can be larger than the size of the transistor Q12, and meanwhile, resistance values of the resistors Rp1 and Rp2 connected to the external terminals P3 and P4 are set so that the resistance value of the resistor Rp1 can be smaller than the resistance value of the resistor Rp2. Moreover, a configuration is adopted so that the current can flow to the resistor Rp1 through the current-detecting MOS transistor Q21 when the charge current is large, and that the current can flow to the resistor Rp2 through the current-detecting MOS transistor Q22 when the charge current is small. In such a way, when the charge current is large, the voltage is prevented from becoming too high in the even where the current that flows to the resistor Rp1 is converted into the voltage, and when the charge current is small, the voltage is prevented from becoming too low in the even where the current that flows to the resistor Rp2 is converted into the voltage.

Then, the gate voltage control circuit 11 includes: a differential amplifier AMP3 that outputs a voltage corresponding to a potential difference between a reference voltage Vref3 and the voltage subjected to the current-voltage conversion by the resistor Rp1 or Rp2; and a gate voltage-controlling transistor Q4 connected between the ground point and the gate terminals of the current-controlling MOS transistors Q11 and Q12. An output voltage of the error amplifier AMP3 is applied to a gate terminal of the gate voltage-controlling transistor Q4, whereby the gate voltages of the current-controlling MOS transistors Q11 and Q12 are controlled in response to a detection current value. That is to say, a gate voltage control circuit 11 is composed of the error amplifier AMP3 and the transistor Q4. High-resistance resistors Rc1 and Rc2 are connected between the gate terminals and input terminals of the current-controlling MOS transistors Q11 and Q12, and a drain current of the transistor Q4 is flown to the resistors Rc1 and Rc2, and is converted into voltages. Then, the voltages concerned are applied to the gate terminals of the current-controlling MOS transistors Q11 and Q12, whereby control is performed so that currents corresponding to the output voltage of the error amplifier AMP3 can flow to the current-controlling MOS transistors Q11 and Q12.

Moreover, in the charge-controlling IC 10, there are provided: a selector 14 for selectively supplying, to the error amplifier AMP3, a current detection voltage Vs1 or Vs2 converted by the resistor Rp1 or Rp2; a selector 15 for selectively supplying the output voltage of the error amplifier AMP3 to the gate terminals of the current-controlling MOS transistor Q11 and the current-detecting transistor Q21 or to the gate terminals of the current-controlling MOS transistor Q12 and the current-detecting MOS transistor Q22; and a switching control circuit 16 that monitors the voltages Vr1 and Vr2 converted by the resistors Rp1 and Rp2 and generates a switching control signal S1 for the above-described selectors 14 and 15.

The switching control circuit 16 can be composed of: two comparators which compare the voltages converted by the resistors Rp1 and rp2 with a reference voltage; and a logic circuit that generates the switching control signal S1 based on outputs of these comparators.

During a period while a charge current Ic is being lower than a predetermined current Ir, the selectors 14 and 15 are subjected to switching control so that terminals b in FIG. 5 can be selected, the current detection voltage Vr2 converted by the resistor Rp2 is supplied to the error amplifier AMP3, the drain voltage of the transistor Q4 is applied to the gate terminals of the transistors Q12 and Q22, and the current-controlling MOS transistor Q12 and the current-detecting MOS transistor Q22, of which sizes are small, are turned to the ON-state.

In such a way, the current from the input terminal P1 passes through the current-controlling MOS transistor, and flows to the battery terminal BAT, whereby the secondary battery 30 is charged. In addition, the current concerned is flown to the high-resistance resistor Rp2, and a voltage, which is higher than the offset voltages of the current-detecting amplifiers AMP1 and AMP2 even if a current value thereof is somewhat small, is generated at an external terminal P4, and is supplied to the error amplifier AMP3. As a result, even in a state where the charge current is small, it becomes possible to perform highly accurate current control by the output current detection circuit 12.

Meanwhile, during a period while the charge current Ic is being higher than the predetermined current Ir, the selectors 14 and 15 are subjected to switching control so that terminals a in FIG. 5 can be selected, the current detection voltage Vr1 converted by the resistor Rp1 is supplied to the error amplifier AMP3, the drain voltage of the transistor Q4 is applied to the gate terminals of the transistors Q11 and Q21, and the current-controlling MOS transistor Q11 and the current-detecting MOS transistor Q21, of which sizes are large, are turned to the ON-state.

In such a way, the current from the input terminal P1 passes through the transistor Q11, and flows to the battery terminal BAT, whereby the secondary battery 30 is charged. In addition, the current concerned is flown to the low-resistance resistor Rp1, and a voltage, which is relatively low even if a current value thereof is somewhat large, is generated at an external terminal P3, and is supplied to the error amplifier AMPS. As a result, even in a state where the charge current is large, the current detection voltage Vr1 does not become the input voltage Vin or more, or is not clamped to the input voltage Vin, and it becomes possible to perform the highly accurate current control by the output current detection circuit 12 over a wide current range.

Moreover, in a similar way to the current and voltage detection circuit shown in FIG. 1, in the charge-controlling IC 10 of this embodiment, there are provided: the comparator CMP1 that compares the input voltage Vin and the reference voltage Vref1 with each other and determines which is larger and which is smaller; a MOS transistor Qs as the switching element SW1 connected between the ground point and the current input terminal P2 to which the current-detecting sensing resistor Rs is connected; and the control logic circuit LG that performs ON/OFF control for the MOS transistor Qs in response to the output of the comparator CMP1. Together with these, a MOS transistor Q5 connected in series to the gate voltage-controlling transistor Q4 is provided, and the output of the above-described comparator CMP1 is applied to a gate terminal of the transistor Q5.

In such a way, while the output of the comparator CMP1 is being changed to the high level as a result of that the voltage Vin outputted from the solar cell becomes a predetermined voltage value or more or the current thereof becomes a predetermined value or more, the transistor Q5 is turned to the ON-state, the drain voltage of the gate voltage-controlling transistor Q4 is transmitted to the gate terminals of the current-controlling MOS transistors Q11 and Q12, and it becomes possible to perform control for the charge current from the input terminal P1 (solar cell) to the output terminal OUT (secondary battery) by the transistors Q11 and Q12.

Moreover, a configuration is adopted so that, when the output of the comparator CMP1 is changed to the low level, the transistor Q5 can be switched OFF to shut off the drain voltage of the gate voltage-controlling transistor Q4, and to thereby stop the control for the charge current by the current-controlling MOS transistors Q11 and Q12. Note that, desirably, the comparator CMP1 and the control logic circuit LG are configured so as to operate not by the power supply voltage from the internal regulator 18 but by a power supply voltage supplied from the secondary battery 30 or the like.

Moreover, in the charge-controlling IC 10 of this embodiment, there is provided a comparator CMP2 that compares the voltage Vr2, which is converted by the resistor Rp2, with a predetermined reference voltage Vref2 and monitors whether or not the charge current supplied to the secondary battery 30 becomes the predetermined current value or less. An output of the comparator CMP2 is inputted to the control logic circuit LG through a switch SW2. The switch SW2 is turned to the ON-state, for example, in a state where the control signal S1 outputted from the switching control circuit 16 selects the terminals b, that is, when the current is flown to the resistor Rp2, and meanwhile, is turned to the OFF-state when the current is not flown to the resistor Rp2. In place of providing the switch SW2, a configuration may also be adopted so that the control signal S1 can be supplied to the control logic circuit LG, and that it can be thereby determined in the control logic circuit LG whether the output of the comparator CMP2 is valid or invalid.

Based on the outputs of the comparators CMP1 and CMP2, the control logic circuit LG generates an ON/OFF control signal of the MOS transistor Qs as the switching element SW1. Specifically, the control logic circuit LG is configured so as to perform the detection by the comparator CMP1 until both of the voltage supply capability and current supply capability of the solar cell exceed references, and to thereafter perform the detection by the comparator CMP2. Moreover, the control logic circuit LG may also be configured so as to include, for example, an AND circuit that takes a logical AND of the outputs of the comparators CMP1 and CMP2, and to output a signal S2 for stopping operations of the internal regulator 18 when either one of the outputs of the comparators CMP1 and CMP2 turns to the low level.

Next, by using FIGS. 6A to 6E, a description is made of operations of the control logic circuit LG in the charge-controlling IC 10 of FIG. 5, which includes the current and voltage detection circuit.

FIGS. 6A to 6E show changes of the voltage supply capability and current supply capability of the solar cell, changes of the outputs of the comparators CMP1 and CMP2 and changes of the ON/OFF states of the MOS transistor Qs as the switching element SW1 in the case where it is assumed that the amount of solar radiation made incident onto the solar cell 20 is increased with the elapse of time, recovers again though drops once at some midpoint, and is thereafter reduced.

Figure 6A:
FIGS. 6A to 6E are timing charts showing operations of the charge-controlling IC of the embodiment.
Figure 6B:
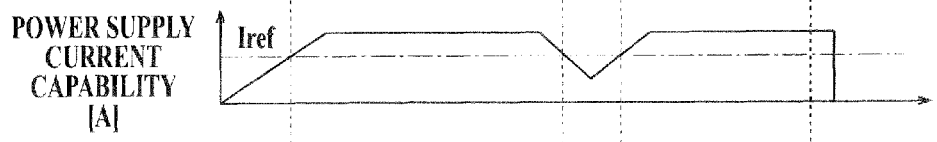
Figure 6C:
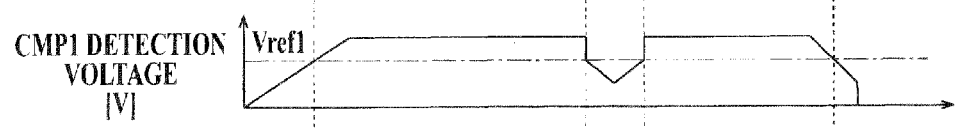

Immediately after the activation, the output Vo of the comparator CMP1 is at the low level, and accordingly, the output of the control logic circuit LG turns to the high level, and the switching element SW1 is turned to the ON-state. Therefore, the current outputted from the solar cell flows to the sensing resistor Rs, the voltage drops by the internal resistance of the solar cell, such a low voltage is applied to the voltage input terminal P1, and the comparator CMP1 compares the voltage concerned and the reference voltage Vref with each other. Accordingly, the detection voltage of the comparator CMP1 is at the low level at the beginning. Thereafter, as the voltage supply capability of the solar cell is being increased as shown in FIG. 6A, the detection voltage (input voltage) of the comparator CMP1 gradually rises as shown in FIG. 6C (period T1).

Figure 6D:
Figure 6E:
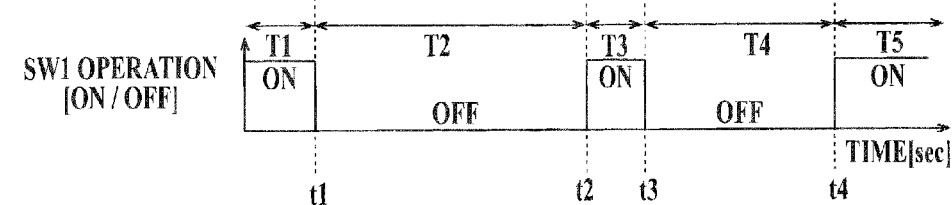

Then, at the point of time when the detection voltage exceeds the reference voltage Vref1, the output Vo of the comparator CMP1 is changed to the high level, and by a signal outputted from the control logic circuit LG, the transistor Qs is turned from the ON-state to the OFF state (timing t1). Then, the current that flows to the sensing resistor Rs is shut off, and the mode is turned to the voltage detection mode (period T2). Moreover, when the output Vo of the comparator CMP1 is changed to the high level, the MOS transistor Q5 is turned to the ON-state. In such a way, the current control of the current-controlling transistor Q11 or Q12 by the gate voltage control circuit 11 is started. Then, the charge current is flown to the transistor Q11 or Q12, whereby the current is also flown to the transistor Q21 or Q22, and as shown in FIG. 6D, an output potential of the comparator CMP2 of the output current detection circuit 12 rises.

Thereafter, when the current supply capability of the solar cell 20 is lowered and the charge current is reduced, a detection current Is2 of the transistor Q22 is also reduced, and the detection voltage of the comparator CMP2 of the output current detection circuit 12 is lowered. Then, when the detection voltage concerned becomes the predetermined value or less, the output of the comparator CMP2 is changed to the low level. In response to this change, the signal outputted from the control logic circuit LG is changed, and the transistor Qs is turned from the OFF-state to the ON-state (timing t2). In such a way, the voltage of the voltage input terminal P1, that is, the detection voltage of the comparator CMP1 is lowered, and the mode is changed to the current detection mode (period T3). Moreover, the transistor Q5 is switched OFF, further, the transistors Q11 and Q12 are switched OFF, and the charge current is shut off. Note that, at this time, the operations of the internal regulator 18 may be stopped.

Thereafter, when the current supply capability of the solar cell 20 rises after a while, and the detection voltage of the comparator CMP1 becomes higher than the reference voltage Vref1, the output Vo of the comparator CMP1 is changed to the high level one more time, the transistor Qs is turned from the ON-state to the OFF-state, and the mode is turned to the voltage detection mode (period T4). Moreover, the transistor Q5 is switched ON, further, the transistor Q11 or Q12 is switched ON, and the charge is resumed (timing t3). In such at type in which the operations of the internal regulator 18 are stopped, the internal regulator 18 may be restarted at the timing t3.

Meanwhile, unlike the above description, when the voltage supply capability of the solar cell 20 is lowered, and the detection voltage of the comparator CMP1 becomes lower than the reference voltage Vref1, the output Vo of the comparator CMP1 is changed to the low level. In response to this change, the signal outputted from the control logic circuit LG is changed, and the transistor Qs is turned from the OFF-state to the ON-state (timing t4). In such a way, the voltage of the voltage input terminal P1, that is, the detection voltage of the comparator CMP1 is lowered, and the mode is changed to the current detection mode (period T5). Moreover, the transistor Q5 is switched OFF, further, the transistor Q11 or Q12 is switched OFF, and the charge current is shut off. Furthermore, the operations of the internal regulator 18 are stopped.

Figure 7:
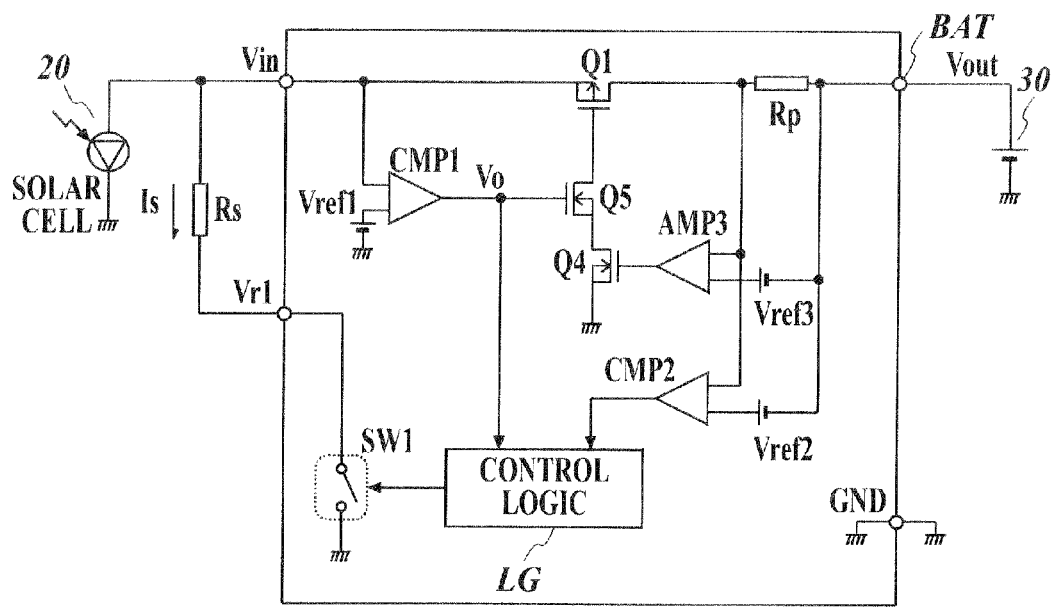
FIG. 7 is a circuit configuration diagram showing a modification example of the charge-controlling IC of the embodiment.
Figure 8A:
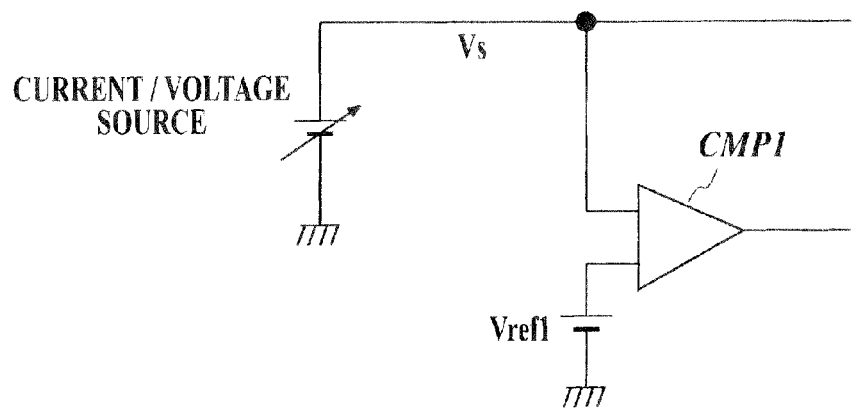
FIGS. 8A and 8B are circuit diagrams showing configuration examples of a voltage detection circuit and a current detection circuit in a conventional charge control device.
Figure 8B:
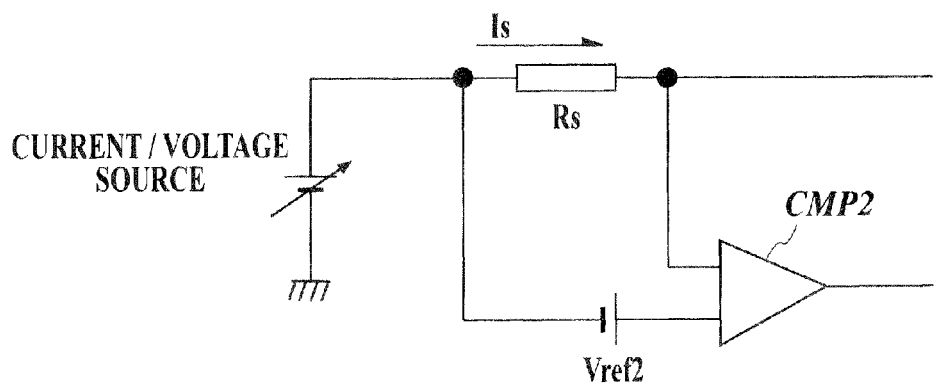

FIG. 7 shows a modification example of the charge-controlling IC 10 of the above-described embodiment. As shown in FIG. 7, this modification example is an example where the number of the current-controlling transistors is set at one (only the transistor Q1 is used), in addition, there are omitted: the current-detecting transistors Q21 and Q22; the bias state-controlling MOS transistors Q31 and Q32 provided in series to these; and the bias-controlling amplifiers AMP1 and AMP2, and in place of providing the external terminals P3 and P4 to which the charge current-detecting resistors Rp1 and Rp2 are connected, a resistor Rp for such detection is provided between the current-controlling transistor Q1 and the output terminal BAT. This modification example has an advantage in that the output current detection circuit can be simplified and the chip size of the IC can be reduced though the loss in the charge current-detecting resistor Rp is increased.

Moreover, in the charge-controlling IC 10 of the embodiment in FIG. 5, which detects the charge current in the current mirror mode, a configuration may be adopted so that the bias state-controlling MOS transistors Q31 and Q32 and the bias-controlling amplifiers AMP1 and AMP2 can be omitted, that the resistors Rp1 and Rp2 can be directly connected to the drain terminals of the current-detecting transistors Q21 and Q22, and that either one of the voltages subjected to the current-voltage conversion by the resistors Rp1 and Rp2 concerned can be selected by the selector 14 and can be inputted to the error amplifier AMP3.

Note that, in the above-described embodiment, the case has been illustrated, where the MOSFET is used as the transistor that composes the charge control circuit; however, a bipolar transistor may be used. Moreover, in the output current detection circuit 12 in the above-described embodiment (FIG. 5), external resistors are used as the current-voltage-converting resistors Rp1 and Rp2 connected in series to the bias state-controlling transistors Q31 and Q32; however, on-chip resistor elements formed in chips may be used. Moreover, in the above-described embodiment, the description has been made of the case where the operations of the internal regulator that generates the power supply voltage of the internal circuit are stopped when the current supply capability or voltage supply capability of the solar cell is lowered; however, a configuration may be adopted so that a current of a current source of the internal circuit, such as a current source of the differential amplifier, can be shut off.

Moreover, in the above description, the description has been made of the example where the present invention is applied to the current and voltage detection circuit that composes the charge device using the solar cell as the primary power supply; however, the present invention is not limited to this, and can be used for a power supply device using the solar cell as a power supply.

According to an aspect of the present invention, there is provided a current and voltage detection circuit comprising:
a voltage input terminal to which a direct current voltage from a power supply is applied;
a voltage comparison circuit that determines which of the voltage applied to the voltage input terminal and a predetermined voltage is larger;
a switching element connected in series to a current-voltage conversion unit, between a positive electrode terminal of the power supply and a reference potential point of the circuit; and
a control circuit that generates a control signal of the switching element in response to an output of the voltage comparison circuit,
wherein the current and voltage detection circuit is configured to turn the switching element to an ON-state and determine the voltage being applied to the voltage input terminal, by the voltage comparison circuit, when either of a voltage supply capability and current supply capability of the power supply is low; and to turn the switching element to an OFF-state by the control signal outputted from the control circuit and determine the voltage being applied to the voltage input terminal, by the voltage comparison circuit, when the voltage comparison circuit determines that the voltage applied to the voltage input terminal is higher than the predetermined voltage.

In accordance with the above-described circuit, in the power supply device and the charge control device, which use the power supply such as the solar cell in which the output current and the output voltage are changed relatively largely, magnitudes of the current and the voltage, which are supplied from the power supply, can be detected by one comparator (voltage comparison circuit), and the circuit scale can be reduced. In addition, in the case where a voltage supply capability or current supply capability of the power supply is large, the switching element provided in series to the current-voltage conversion unit (sensing resistor) is switched OFF, and accordingly, it becomes possible to suppress a current consumption.

Preferably, there is provided a current control circuit comprising:
the current and voltage detection circuit;
a current-controlling transistor that is connected between the voltage input terminal and an output terminal and controls a current flown from the voltage input terminal to the output terminal;
a current-detecting transistor that is connected in parallel to the current-controlling transistor, has a size smaller than a size of the current-controlling transistor, and has a control terminal applied with the same control voltage as a voltage for the current-controlling transistor; and
a control voltage generation circuit that generates a control voltage for the current-controlling transistor in response to a voltage converted by either of the current-detecting transistor and a second current-voltage conversion unit connected in series to the current-controlling transistor.

In such a way, in the power supply device and the charge control device, which control and output the current by using the power supply such as the solar cell in which the output current and the output voltage are changed relatively largely, the current control circuit can be realized, which is capable of detecting the magnitudes of the current and the voltage, which are supplied from the power supply, by one voltage comparison circuit, is capable of reducing the circuit scale, and in addition, is capable of suppressing the current consumption by switching OFF the switching element in series to the current-detecting current-voltage conversion unit in the case where the voltage supply capability or current supply capability of the power supply is large.

Preferably, the current control circuit, further comprises:
an internal regulator that generates a power supply voltage of an internal circuit based on either of a direct current voltage from the power supply and a direct current voltage from a secondary battery connected to the output terminal,
wherein the control circuit is configured to output a signal for stopping operations of the internal regulator in a case where either of the voltage supply capability and the current supply capability of the power supply is small in response to the output of the voltage comparison circuit.

Preferably, the control circuit is configured to output a signal for turning a current source that flows an operation current of an internal circuit to the OFF-state in a case where either of the voltage supply capability and the current supply capability of the power supply is small in response to the output of the voltage comparison circuit.

In such a way, it becomes possible to reduce the current consumption of the internal circuit.

Preferably, the current control circuit, further comprises:
a second voltage comparison circuit that compares a voltage converted by the second current-voltage conversion unit and a predetermined reference voltage with each other,
wherein the control circuit is configured to output a signal for stopping the operations of the internal regulator or turning the current source that flows the operation current of the internal circuit to the OFF-state in response to the output of the voltage comparison circuit and an output of the second voltage comparison circuit.

In such a way, also in the case where the output current becomes a predetermined value or less, it becomes possible to reduce the current consumption of the internal circuit by stopping the operations of the internal regulator or the current source of the internal circuit.

In accordance with the preferred embodiment of the present invention, an effect is brought that, in the power supply device and the charge control device, which use the power supply such as the solar cell in which the output current and the output voltage are changed relatively largely, the current and voltage detection circuit can be realized, which is capable of detecting the current and the voltage by one comparator.

The entire disclosure of Japanese Patent Application No. 2010-220508 filed on Sep. 30, 2010 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A current and voltage detection circuit comprising:
a voltage input terminal to which a direct current voltage from a power supply is applied;
a voltage comparison circuit that determines which of the voltage applied to the voltage input terminal and a predetermined voltage is larger;
a switching element connected in series to a current-voltage conversion unit, between a positive electrode terminal of the power supply and a reference potential point of the circuit; and
a control circuit that generates a control signal of the switching element in response to an output of the voltage comparison circuit,
wherein the current and voltage detection circuit is configured to turn the switching element to an ON-state and determine the voltage being applied to the voltage input terminal, by the voltage comparison circuit, when either of a voltage supply capability and current supply capability of the power supply is low; and to turn the switching element to an OFF-state by the control signal outputted from the control circuit and determine the voltage being applied to the voltage input terminal, by the voltage comparison circuit, when the voltage comparison circuit determines that the voltage applied to the voltage input terminal is higher than the predetermined voltage.

2. A current control circuit comprising:
the current and voltage detection circuit according to claim 1;
a current-controlling transistor that is connected between the voltage input terminal and an output terminal and controls a current flown from the voltage input terminal to the output terminal;
a current-detecting transistor that is connected in parallel to the current-controlling transistor, has a size smaller than a size of the current-controlling transistor, and has a control terminal applied with the same control voltage as a voltage for the current-controlling transistor; and
a control voltage generation circuit that generates a control voltage for the current-controlling transistor in response to a voltage converted by either of the current-detecting transistor and a second current-voltage conversion unit connected in series to the current-controlling transistor.

3. The current control circuit according to claim 2, further comprising:
an internal regulator that generates a power supply voltage of an internal circuit based on either of a direct current voltage from the power supply and a direct current voltage from a secondary battery connected to the output terminal,
wherein the control circuit is configured to output a signal for stopping operations of the internal regulator in a case where either of the voltage supply capability and the current supply capability of the power supply is small in response to the output of the voltage comparison circuit.

4. The current control circuit according to claim 2, wherein the control circuit is configured to output a signal for turning a current source that flows an operation current of an internal circuit to the OFF-state in a case where either of the voltage supply capability and the current supply capability of the power supply is small in response to the output of the voltage comparison circuit.

5. The current control circuit according to claim 3, further comprising:
a second voltage comparison circuit that compares a voltage converted by the second current-voltage conversion unit and a predetermined reference voltage with each other,
wherein the control circuit is configured to output a signal for stopping the operations of the internal regulator or turning a current source that flows an operation current of an internal circuit to the OFF-state in response to the output of the voltage comparison circuit and an output of the second voltage comparison circuit.

6. The current control circuit according to claim 4, further comprising:

a second voltage comparison circuit that compares a voltage converted by the second current-voltage conversion unit and a predetermined reference voltage with each other, wherein the control circuit is configured to output a signal for stopping operations of an internal regulator or turning the current source that flows the operation current of the internal circuit to the OFF-state in response to the output of the voltage comparison circuit and an output of the second voltage comparison circuit.

* * * * *